United States Patent [19]

Doddapaneni

[11] Patent Number: 4,698,283
[45] Date of Patent: Oct. 6, 1987

[54] ELECTROCHEMICAL CELL HAVING IMPROVED ACTIVE LIFE

[75] Inventor: Narayan Doddapaneni, Glenside, Pa.

[73] Assignee: Honeywell Inc., Minneapolis, Minn.

[21] Appl. No.: 911,578

[22] Filed: Sep. 25, 1986

[51] Int. Cl.$^4$ ............................................. H01M 4/36
[52] U.S. Cl. ...................................... 429/101; 429/196; 429/198
[58] Field of Search ................ 429/101, 196, 198, 194

[56] References Cited

U.S. PATENT DOCUMENTS

| | | | |
|---|---|---|---|
| 4,251,607 | 2/1981 | Yamaki et al. | 429/199 X |
| 4,252,875 | 2/1981 | Venkatasetty | 429/199 X |
| 4,255,498 | 3/1981 | Yoshida | 429/27 |
| 4,469,763 | 9/1984 | Walsh et al. | 429/198 X |
| 4,550,067 | 10/1985 | Horiba et al. | 429/199 X |

FOREIGN PATENT DOCUMENTS 58-46579  3/1983  Japan .................................... 429/198

Primary Examiner—Brian E. Hearn
Assistant Examiner—Stephen J. Kalafut
Attorney, Agent, or Firm—Charles G. Mersereau

[57] ABSTRACT

Anode passivation and premature cell failure associated with anode deterioration due to corrosion has been greatly reduced in Li/SOCl$_2$ cells by the addition of small amounts of tetracarboxylated metal macrocyclic complexes such as cobalt tetracarboxylated phenylporphyrin (CoTCPP) or cobalt tetracarboxylated phthalocyanine (CoTCPC) to the electrolyte.

21 Claims, 6 Drawing Figures

VOLTAGE DELAY CHARACTERISTICS OF LI/SOCl$_2$ CELLS WITH BASELINE CATHODES AND 1.4 M LiAlCl$_4$·SO$_2$/SOCl$_2$ +0.05 mg OF (CoTCPP)/(CC OF ELECTROLYTE) AT A CURRENT RATE OF 1 mA/cm$^2$

VOLTAGE DELAY CHARACTERISTICS OF Li/SOCl$_2$ CELLS WITH BASELINE CATHODES AND 1.4M LiAlCl$_4$·SO$_2$/SOCl$_2$ ELECTROLYTE AT A CURRENT RATE OF 1 mA/cm$^2$

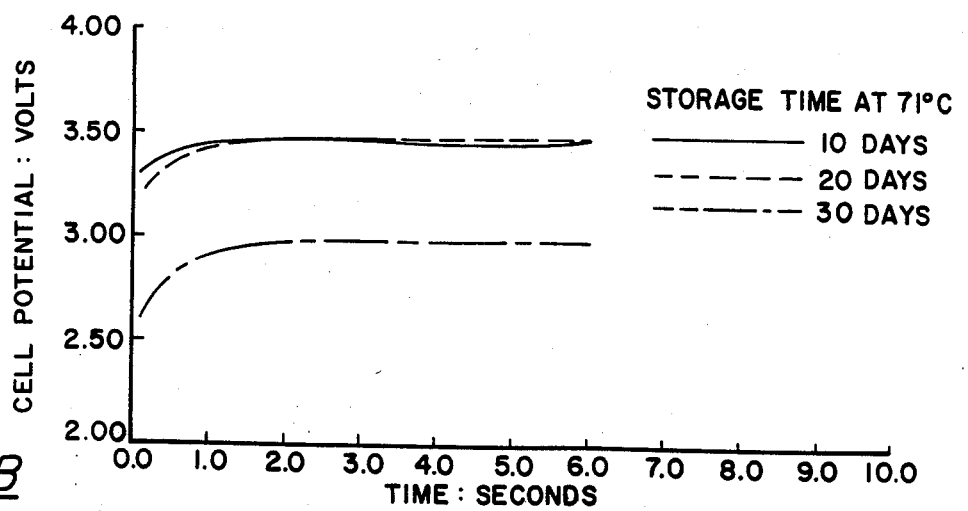

Fig. 2B
(PRIOR ART) VOLTAGE DELAY CHARACTERISTICS OF Li/SOCl$_2$ CELLS WITH (CoPC)$_n$ CATHODES AND 1.4M LiAlCl$_4 \cdot$SO$_2$/SOCl$_2$ ELECTROLYTE AT A CURRENT RATE OF 1 mA/cm$^2$

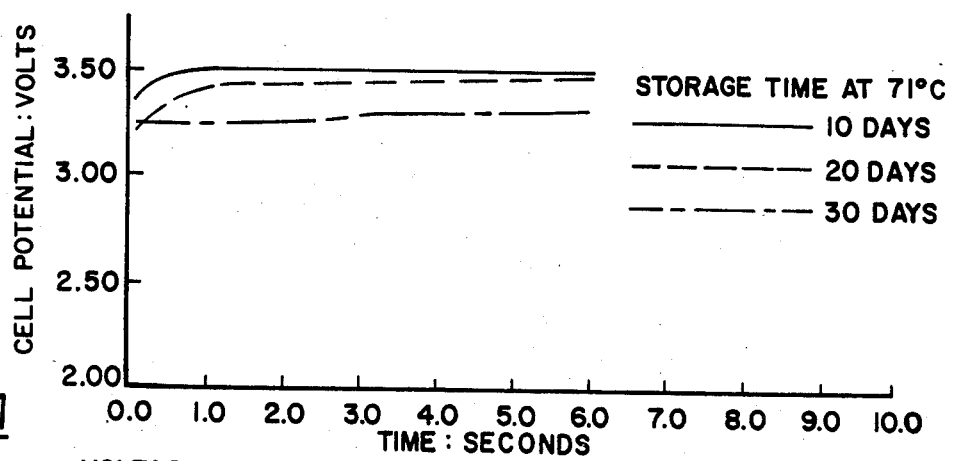

Fig. 3A VOLTAGE DELAY CHARACTERISTICS OF Li/SOCl$_2$ CELLS WITH BASELINE CATHODES AND 1.4M LiAlCl$_4 \cdot$SO$_2$/SOCl$_2$ + 0.05 mg OF (CoTCPP)/(CC OF ELECTROLYTE) AT A CURRENT RATE OF 1 mA/cm$^2$

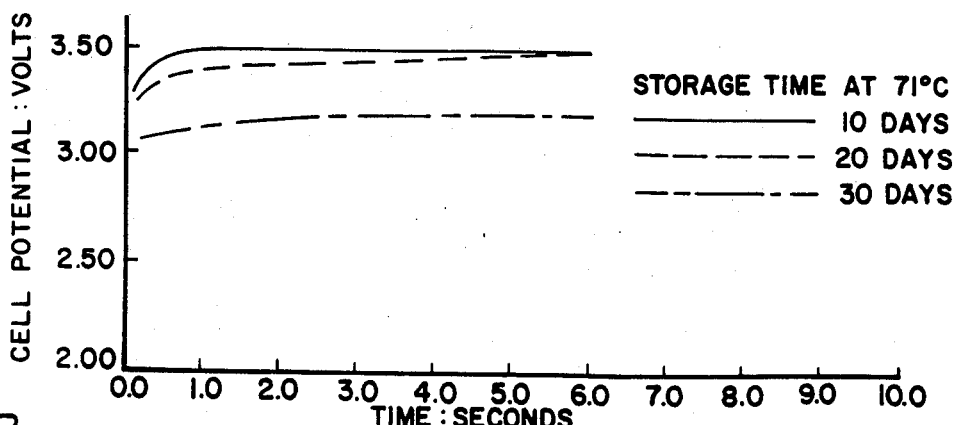

Fig. 3B VOLTAGE DELAY CHARACTERISTICS OF Li/SOCl$_2$ CELLS WITH (CoPC)$_n$ CATHODES AND 1.4M LiAlCl$_4 \cdot$SO$_2$/SOCl$_2$ + 0.05 mg OF (CoTCPP)/(CC OF ELECTROLYTE) AT A CURRENT RATE OF 1 mA/cm$^2$ DISCHARGE CHARACTERISTICS OF Li/SOCl$_2$ D-CELLS WITH (CoPC)$_n$ CATHODES AND 1.4M LiAlCl$_4$·SO$_2$/SOCl$_2$ + 0.05 mg OF (CoTCPP)/(CC OF ELECTROLYTE) AFTER FOUR WEEK STORAGE AT 55°C

ELECTROCHEMICAL CELL HAVING IMPROVED ACTIVE LIFE

BACKGROUND OF THE INVENTION

The invention herein described was made in the course of or under a contract or sub-contract thereunder with the Department of the Army.

1. Field of the Invention

The present invention relates generally to the field of non-aqueous electrochemical cells and, more particularly, to electrolyte additives which improve stability and inhibit anode passivation and corrosion in such cells.

2. Description of the Prior Art

Much work has been done in the field of high energy battery systems utilizing highly reactive anode materials such as alkali or alkaline earth metals in combination with non-aqueous electrolytes. The electrolyte is normally composed of a solute which is commonly a metal salt or a complexmetal salt of the anode material dissolved in a compatible non-aqueous solvent depolarizer such as $SOCl_2$. An inert/cathode, usually of carbon black, is also used in such cells. In order to increase the rate capability of such cells, cathode dopants or catalysts such as transition metal macrocyclic complexes have been utilized and conjunction with the cathodes. These include, for example, transition metal macrocyclic complexes of phthalocyanines, Schiff's base and certain porphyrins.

The cells are of two basic types, namely, active and reserve. Active cells are those in which the electrochemical couple of the cell is always in an operative state after assembly of the cell, i.e., both electrodes are in contact with the electrolyte at all times. Reserve cells, on the other hand, are cells in which at least one component of the cell necessary to produce current between the electrodes, normally the electrolyte, is separately contained or isolated from the others, as by storing the electrolyte in a glass ampule, thereby rendering the cell inoperative. The cell is stored in the inoperative state and is activated at the desired time by an external event such as a sudden impact which ruptures the ampule. This allows the electrolyte to flow throughout the cell to complete the internal circuit.

The potential uses of electrochemical couples such as those mentioned above in high rate, high power batteries have not been fully realized, however, partially because of the very limited life of active cells. In the case of lithium/thionyl chloride systems, reactions between the lithium anode and the electrolyte medium or species in the electrolyte medium result in passivation of the anode and even corrosion or destruction of the anode after a relatively short period of time. This is especially true if metal organic complexes or dopants are utilized with respect to the cathode which have some soluability in the electrolyte medium.

In the prior art, sulfur dioxide and lithium oxide have been utilized in the electrolyte to assist in controlling passivating film growth on the anode which occurs upon exposure to the electrolyte medium when such cells are activated. Another technique utilizes precoating of the anode with polymers such as vinyl chloride, acrylcyanonitriles or the like. This however prevents anode passivation only during the initial active stand of the cells. Once these cells are subjected to load, the coating film will disintegrate and leave the anode unprotected from further passivation and corrosion.

SUMMARY OF THE INVENTION

In accordance with the present invention, both voltage delay characteristics associated with anode passivation and premature cell failure associated with anode deterioration due to corrosion has been greatly reduced in $Li/SOCl_2$ cells by the addition of small amounts of tetracarboxylated metal macrocyclic complexes such as cobalt tetracarboxylated phenylporphyrin (CoTCPP) or cobalt tetracarboxylated phthalocyanine (CoTCPC) to the electrolyte. The additives CoTCPP and CoTCPC have the following structural formulae:

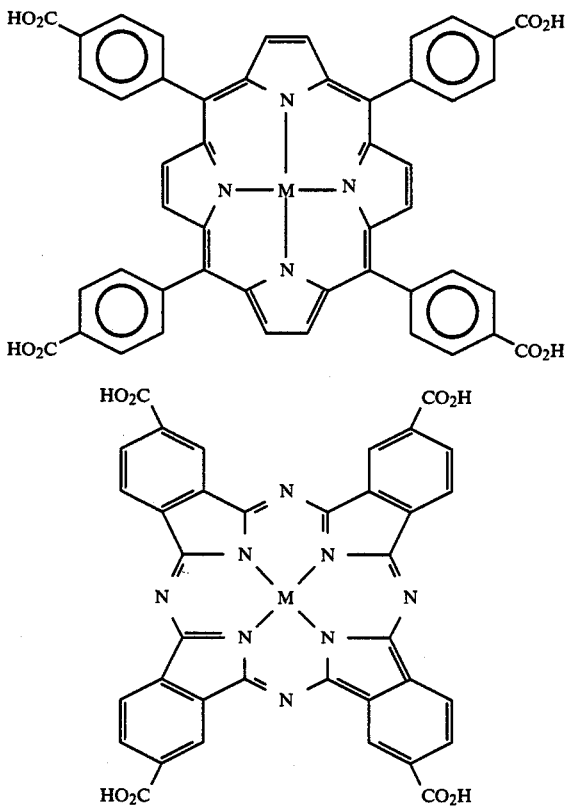

M = Co

The preferred embodiment involves the addition of small amounts of cobalttetracarboxylated phenylporphyrin (CoTCPP) to an electrolyte medium consisting of $LiAlCl_4/SOCl_2$ to which an approximately equal molar amount of $SO_2$ has been added, this alleviates the problem of voltage delay upon startup of the cell and decidedly prolongs the storage time of the cell in the active state during which full, or nearly full cell output potential may be achieved.

While other concentrations may be used, the preferred embodiment uses a 1.4M $LiAlCl_4.SO_2/SOCl_2$ solution as the electrolyte medium into which from approximately 0.01 to 0.1 mg of (CoTCPP)/cc of electrolyte are added. In the above electrolyte solution, approximately 0.05 mg of (CoTCPP)/cc of electrolyte appears to be the optimum amount based on presently known storage results.

BRIEF DESCRIPTION OF THE DRAWINGS

In the drawings:

FIGS. 2A and 2B depict the operation of prior art cells stored in the active condition at elevated temperatures for varying amounts of time;

FIGS. 3A and 3B show cells corresponding sequentially to those of FIGS. 2A and 2B utilizing an electrolyte additive of the present invention.

DESCRIPTION OF THE PREFERRED EMBODIMENTS

Figure 1:
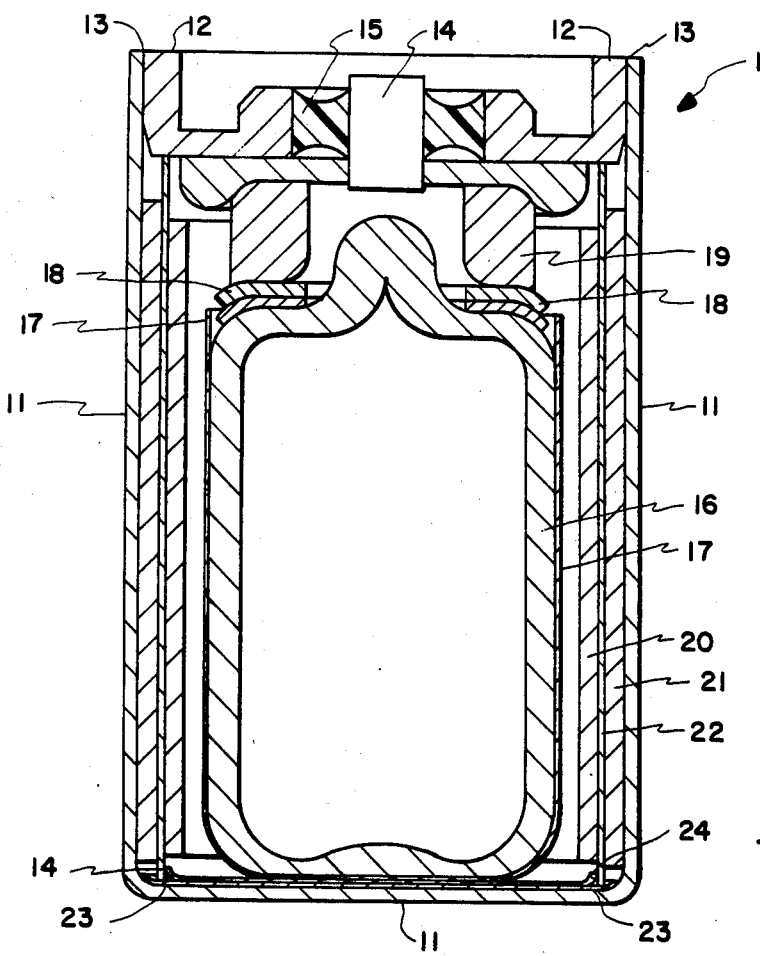
FIG. 1 is a crossectional view of a typical reserve cell in which the invention may be used.

FIG. 1 depicts the construction of a typical reserve cell prior to activation and representative of the cell utilized to gather the data depicted in FIGS. 2A, 2B, 3A, and 3B. The cell is shown generally at 10 and is basically in the configuration of a right circular cylinder. It has a metallic outer shell 11, typically 304 stainless steel, which also serves as the positive terminal in connecting the cell to external circuitry. A top sealing member 12, also normally 304 stainless steel is sealed to the outer shell or case 11 as by a circumferencial laser-induced weld at 13 and to the negative terminal pin 14 by a glass-to-metal seal 15. The negative terminal pin is normally a nickel alloy and may be a 52 nickel (Jefferson). Internally the cell includes a sealed glass ampule 16 containing the electrolyte which is surrounded by an ampule barrier 17, ampule support pads 18 and an ampule support shim 19 which hold the ampule rigidly in place within the cell structure. The ampule barrier, ampule support pad and ampule support shim are normally made of a relatively tough inert plastic material such as TEFZEL which is a trademark of the E. I. DuPont de Neumers Corporation of Wilmington, Del. The cell also contains an anode 20, cathode 21 and separator 22 together with a bottom insulating layer 23 and separator layer 24 described in greater detail next below.

A particular size of cell of the class of the crossection depicted in FIG. 1 utilized components having the following physical characteristics:

A. Lithium Anode:
Dimensions (in inches):
Thickness=0.015"–0.002"
Width=0.65"–0.04"
Length=1.14"–0.04"
Anode Area=4.78 cm$^2$ (one side)
Anode Capacity=348 mAH B. Carbon Cathode:
Dimensions (in inches):
Thickness=0.020"–0.001"
Width=0.645"–0.035"
Length=1.335"–0.035"
Average Surface Area=5.34 cm$^2$ (one side)
Anode Capacity=140 mg C. Separator (Mead glass mat):
Dimensions (in inches):
Thickness=0.005"–0.001"
Width=0.73"–0.02"
Length=1.53"–0.04"

316L stainless steel mesh, 3SS 10-125 grids, from Delker were used as current collectors for both anode and cathode. Grid dimensions are the same for both electrodes and are as follows:
Width: 0.61"–0.04"
Length: 1.30"–0.06"

With reference to the electrolyte of FIGS. 2A, 2B, 3A and 3B, the glass ampule shown in FIG. 1 was filled with 0.51±0.02 ml of 1.4M LiAlCl$_4$.SO$_2$/SOCl$_2$ electrolyte and was sealed. The electrolyte was made by dissolving LiAlCl$_4$ salt, obtained from Anderson Physics Laboratory, Chicago, IL, in distilled thionyl chloride solvent. Purified SO$_2$ was then added to obtain the formulated electrolyte. The second electrolite was achieved by adding 0.05 mg of Cobalt tetracarboxylated phenylporphyrin to 1 cc of electrolyte solution.

The (CoPC)$_n$ cathodes were constructed according to the following steps. Polymeric cobalt phthalocyanine catalyst sythensized by heating a mixture of 3,3'¦4,4'¦-benzenetetracarboxylic dianhydride¦ cobalt chloride and urea at 200° C. for approximately one hour, was impregnated onto carbon from concentrated sulfuric acid solution by diluting with ice water. The catalyst-carbon mix, after wishing with water, was dried at 120° C. and was then heat-treated at 500±10° C. for two hours under inert atmosphere. The heat treatment causes the otherwise inactive (CoPC)$_n$ complex to acquire catalytic activity and also makes the complex insoluble in the electrolyte. Cathodes of 0.020-0.001 inch thick were fabricated and dried under vacuum at 150° C. Cathodes contained approximately 10% by weight of Teflon-6 (PTFE) (DuPont) binder. One hundred percent compressed grade Shawinigan Acetylene Black (SAB) carbon was used for all cathodes.

The baseline cathodes were fabricated as above except that no (CoPC)$_n$ was used and no high temperature heat treatment step was needed. They were composed of SAB carbon and approximately 10% PTFE binder.

The completed cells were activated by impacting the bottom of the cell with a right circular cylindrical pellet made of 304 Stainless Steel. The shock effect of the pellet impact resulted in a shattered ampule. The electrolyte was then absorbed by the electrode stack activating the cell. Some cells were set aside for performance evaluation of fresh cells. Remaining cells were placed in an environmental chamber at 71° C. (160° F.). Some of these cells were periodically removed, evaluated for voltage delay, and discharged at low rates (1 mA/cm$^2$) to measure the anode capacity for the purpose of evaluating anode loss due to parasitic reactions.

Figure 2A:
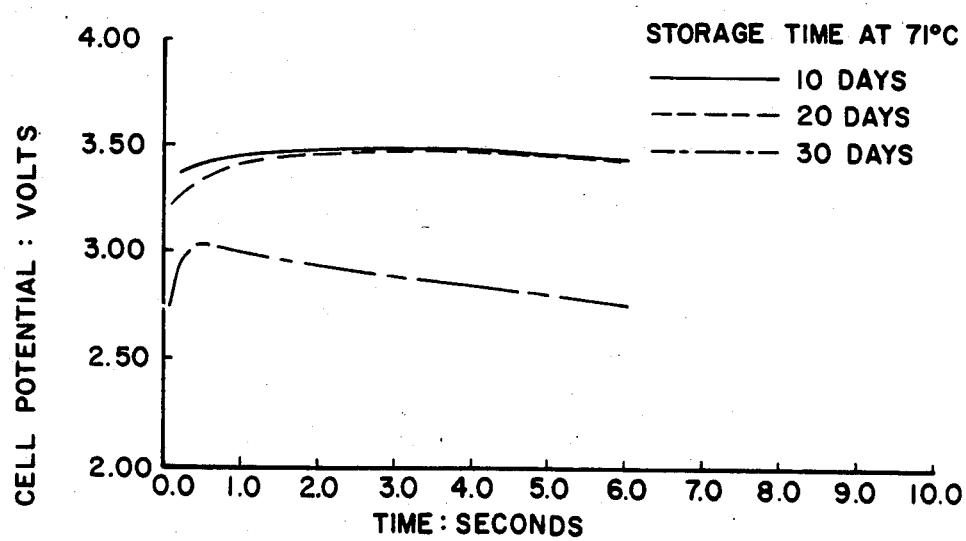

The results of voltage delay and cell output characteristics after activation and storage at elevated temperature for 10, 20 and 30 days are depicted in FIGS. 2A and 2B for electrolytes without additives of the present invention. FIGS. 3A and 3B depict the same characteristics of cells using the electrolyte including CoTCPP.

It can be seen from FIGS. 2A and 2B that, with only SO$_2$ as an electrolyte additive, both cells using carbon baseline cathodes (2A) and those containing (CoPC)$_n$ catalyst showed increased voltage delay and a pronounced decrease in cell output after 30 days.

As seen in FIGS. 3A and 3B, based on the data for 30-day storage, it can be concluded that SO$_2$ and CoTCPP addition to the electrolyte does improve considerably the voltage delay problem associated with the Li/SOCl$_2$ electrochemistry system. Addition of 0.05 mg of CoTCPP per ml of 1.4M LiAlCl$_4$.SO$_2$/SOCl$_2$ electrolyte does indeed further minimize the voltage delay.

In other cells, using SO$_2$ and CoTCPP in the electrolyte, approximately 92 percent of theoretical lithium capacity was achieved even after three-month storage at 71° C. Still other cells using only SO$_2$ in the electrolyte realized only 69 percent of the theoretical lithium capacity after a three-month storage.

In addition 30 standard high-rate active D cells were evaluated before and after storage at 55° C. The voltage delay behavior and the cell performance at constant current of 2 amps were examined at three operating temperatures (−29° C., 21° C., and 55° C.).

Figure 4:
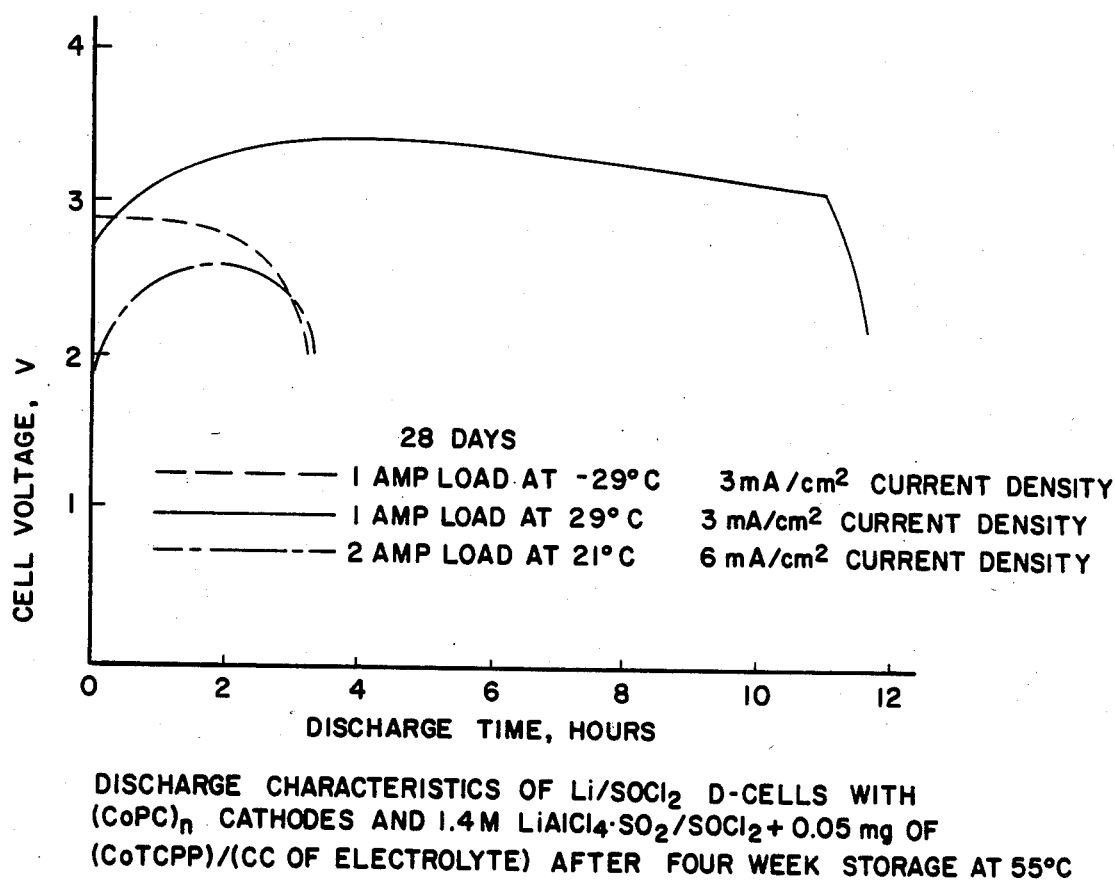
FIG. 4 represents discharge curves of D-cells utilizing the same additive at various loads and temperatures after storage in the active state.

After four-week storage at 55° C., the cell voltage and the cell capacity slightly decreased under 2 amp load. However, at a current load of 1 amp, capacities of 3 and 11.5 Ahrs were obtained at operating temperatures of −29° C. and 21° C., respectively. This compared to 4.8 and 12.5 A hours obtained respectively in fresh cells. The voltage delay appears to be minimized by the use of an electrolyte doped with $SO_2$ and CoTCPP as shown in the FIG. 4. If further precautions such as (a) use of purified salts and solvent and (b) controlling the moisture, particularly during cell build and activation, should result in the minimization of loss in cell capacity and cell voltage.

Whereas the particular illustrations depicted herein have depicted the effect of CoTCPP in particular, success has also been achieved using an additive of CoTCPC although to a slightly lesser degree. It is contemplated that other similar tetracarboxylated metal macrocyclic complexes will have the same characteristics.

From the foregoing description, one skilled in the art can easily ascertain the essential characteristics of this invention, and without departing from the spirit and scope thereof, can make various changes and modifications of the invention to adapt it to various usages and conditions.

Having thus described the invention, what is claimed is:

1. In an electrochemical cell having an active metal anode, an electrolyte solution comprising an oxychloride solvent depolarizer containing a metal salt of the anode and a cathode, the improvement comprising an amount of additive in said electrolyte selected from the group consisting of CoTCPP and CoTCPC and mixtures thereof.

2. In an electrochemical cell having a lithium anode, an electrolyte solution comprising an amount of $LiAlCl_4$ salt in $SOCl_2$ solvent depolarizer, and a cathode comprising carbon, the improvement comprising an amount of additive in said electrolyte selected from the group consisting of CoTCPP and CoTCPC.

3. The cell of claim 2 wherein said cathode contains an amount of $(CoPC)_n$.

4. The cell of claim 2 further comprising an amount of $SO_2$ in said electrolyte solution.

5. The cell of claim 3 further comprising an amount of $SO_2$ in said electrolyte solution.

6. The cell of claim 3 wherein said additive is CoTCPP.

7. The cell of claim 5 wherein said additive is CoTCPP.

8. In an electrochemical cell having a lithium anode, an electrolyte solution comprising an amount of $LiAlCl_4$ salt and an amount of $SO_2$ in $SOCl_2$ solvent depolarizer, and a cathode comprising carbon, the improvement comprising an amount of CoTCPP in said electrolyte solution.

9. The cell of claim 8 wherein the concentration of said $SO_2$ is substantially equal to that of the $LiAlCl_4$.

10. The cell of claim 9 wherein the concentration of $LiAlCl_4$ is approximately 1.4M.

11. The cell of claim 8 wherein the concentration of said CoTCPP is from 0.01 to 0.1 mg/cc of electrolyte.

12. The cell of claim 9 wherein the concentration of said CoTCPP is from 0.01 to 0.1 mg/cc of electrolyte.

13. The cell of claim 10 wherein the concentration of said CoTCPP is from 0.01 to 0.1 mg/cc of electrolyte.

14. The cell of claim 13 wherein the concentration of said CoTCPP is 0.05 mg/cc of electrolyte.

15. The cell of claim 8 wherein said cathode contains an amount of $(CoPC)_n$.

16. The cell of claim 9 wherein said cathode contains an amount of $(CoPC)_n$.

17. The cell of claim 10 wherein said cathode contains an amount of $(CoPC)_n$.

18. The cell of claim 11 wherein said cathode contains an amount of $(CoPC)_n$.

19. The cell of claim 12 wherein said cathode contains an amount of $(CoPC)_n$.

20. The cell of claim 13 wherein said cathode contains an amount of $(CoPC)_n$.

21. The cell of claim 14 wherein said cathode contains an amount of $(CoPC)_n$.

* * * * *